May 8, 1962 L. L. SMITH 3,033,931

REVERTING CALL TELEPHONE SYSTEM

Filed Jan. 15, 1957 3 Sheets-Sheet 1

INVENTOR.
LESTER L. SMITH
BY
C. A. Gulbrandsen
ATTY.

May 8, 1962 L. L. SMITH 3,033,931

REVERTING CALL TELEPHONE SYSTEM

Filed Jan. 15, 1957 3 Sheets-Sheet 2

REVERTING CALL SWITCH 200

INVENTOR.

LESTER L. SMITH

BY

C. A. Gullbrandsen

ATTY.

May 8, 1962 L. L. SMITH 3,033,931

REVERTING CALL TELEPHONE SYSTEM

Filed Jan. 15, 1957 3 Sheets-Sheet 3

REVERTING CALL SWITCH 200

INVENTOR.
LESTER L. SMITH

BY

C. A. Gulbrandsen

ATTY.

United States Patent Office 3,033,931
Patented May 8, 1962

3,033,931
REVERTING CALL TELEPHONE SYSTEM
Lester L. Smith, McHenry, Ill., assignor to Automatic Electric Laboratories, Inc., a corporation of Delaware
Filed Jan. 15, 1957, Ser. No. 634,283
3 Claims. (Cl. 179—17)

The present invention relates to automatic telephone systems and, more particularly, to improvements in apparatus for setting up reverting call connections between two substations associated with the same multiparty subscriber line.

It is an object of the invention to provide for use in a system of the character described, improved reverting call service which is so arranged that, when a calling subscriber calls another subscriber on his party line he will prefix a digit, indicating a reverting call, to the regular telephone directory number of the desired called subscriber.

In accordance with another object of the invention, the reverting call service is initiated responsive to the dialling of the reverting call prefixed digit followed by dialling of digits of the directory number, and in which all of the directory digits, except the last, are directly repeated to operate the regular switch train to the called line.

In accordance with another object of the invention as above described, the last digit is stored in a reverting call switch until the calling party hangs up, which initiates means for repeating the last digit to a connector and releases the preceding equipment.

It is another object of the invention to provide a reverting call switch which is arranged to store the last digit of the called directory number to return busy tone to the calling party after completion of dialling, to transmit the stored digit to the connector to cause it to selectively ring the called subscriber when the calling party hangs up after receipt of the busy tone, to cause the release of the switches preceding the reverting call switch thereby enabling the connector to select and ring the called subscriber, to maintain the switches succeeding the reverting call switch in operated position until the call is answered, either by the called or calling subscriber, and to give the answering subscriber a special reverting call tone to indicate to the called subscriber that he is answering a reverting call. In case the calling subscriber answers before the called subscriber such tone indicates to the calling subscriber that the called subscriber has not answered.

It is a further object of the invention to provide a reverting call switch which is arranged with time-out, whereby the switch train releases after a predetermined time interval if the called line is busy or if the reverting call is not answered.

Figure 1:
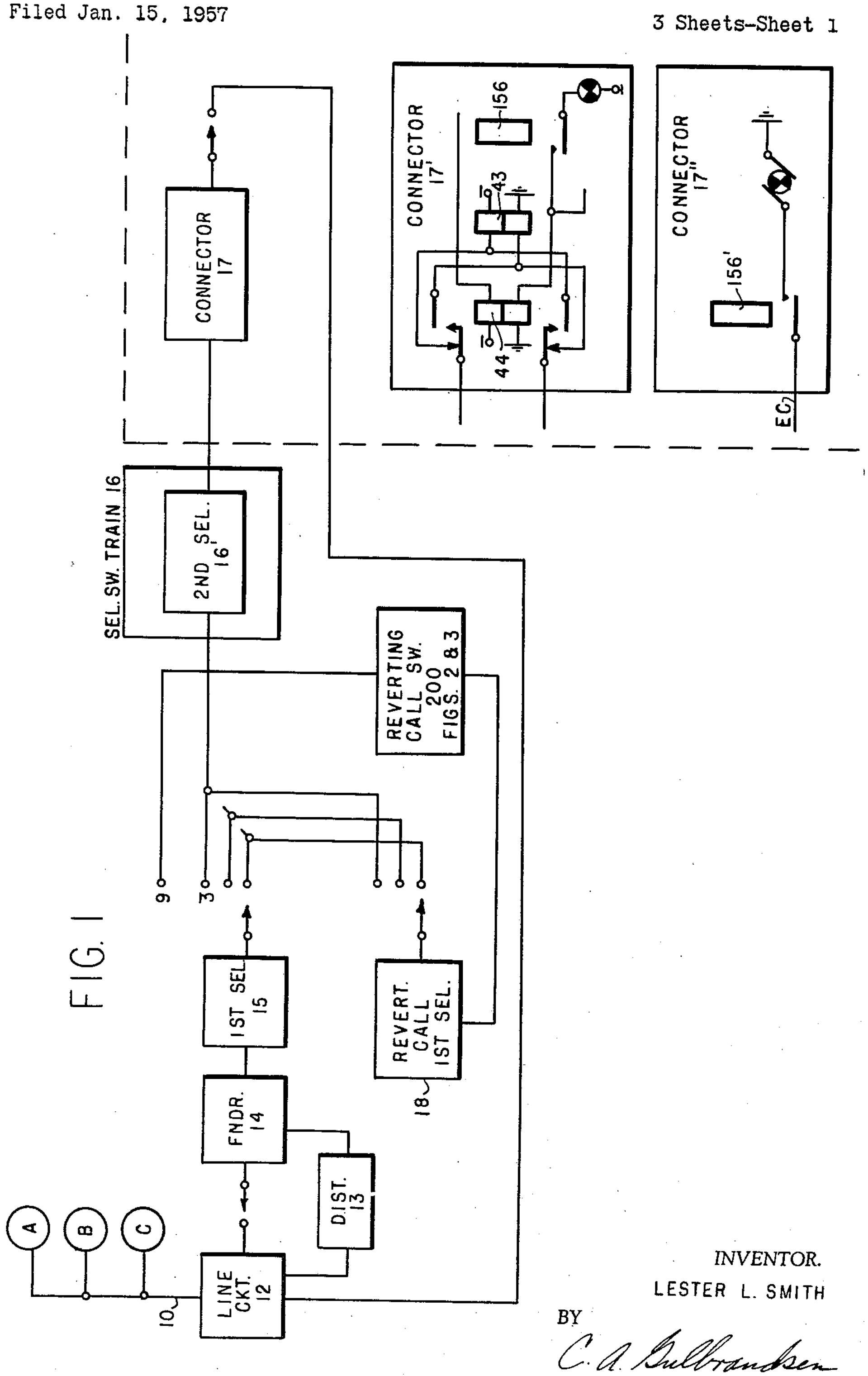

The invention, both as to its organization and method of operations, together with further objects and advantages thereof, will best be understood by reference to the specification taken in connection with the accompanying drawings in which:

FIG. 1 illustrates a preferred trunking diagram of a telephone system incorporating therein the present invention.

Figure 2:
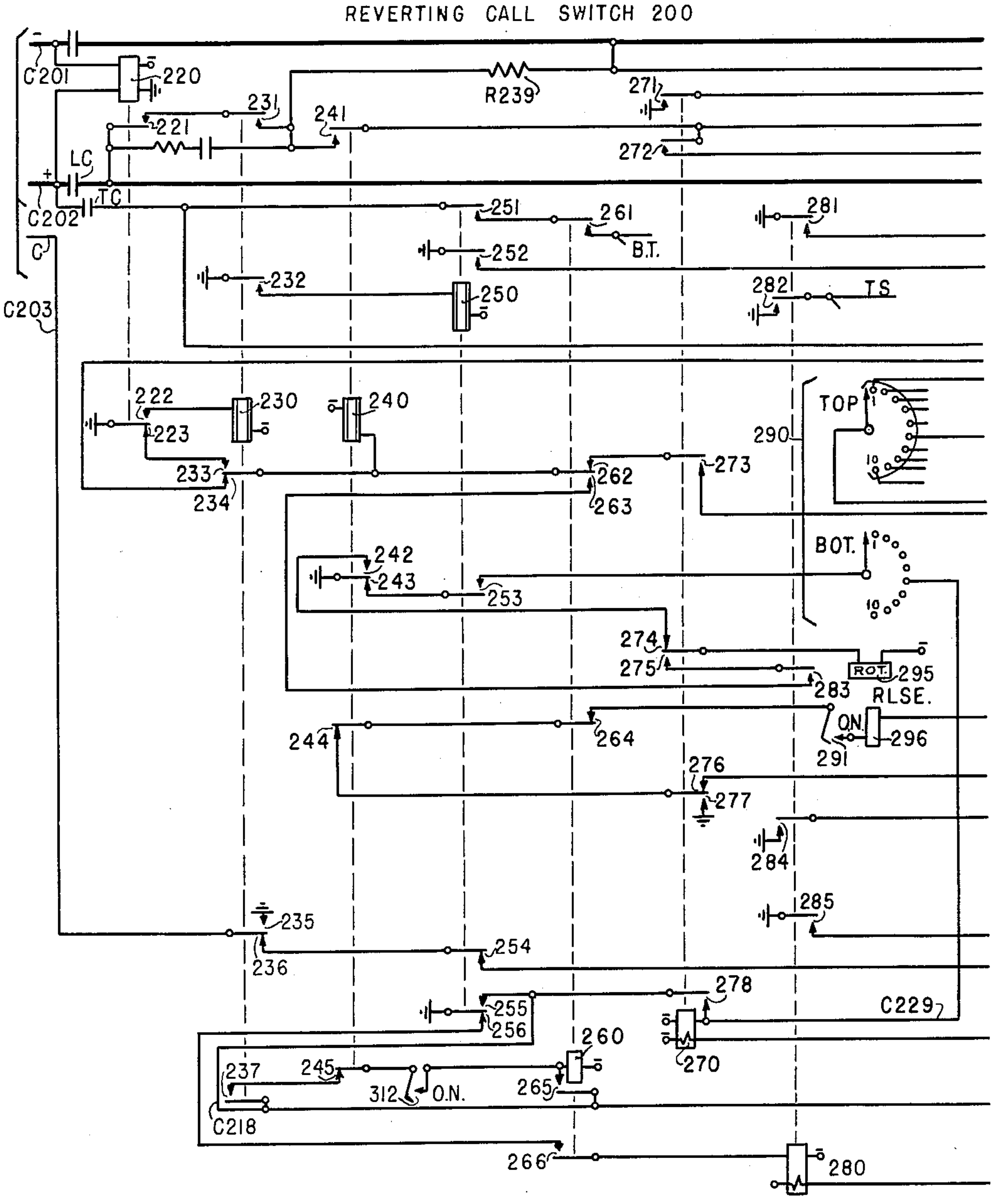
Figure 3:
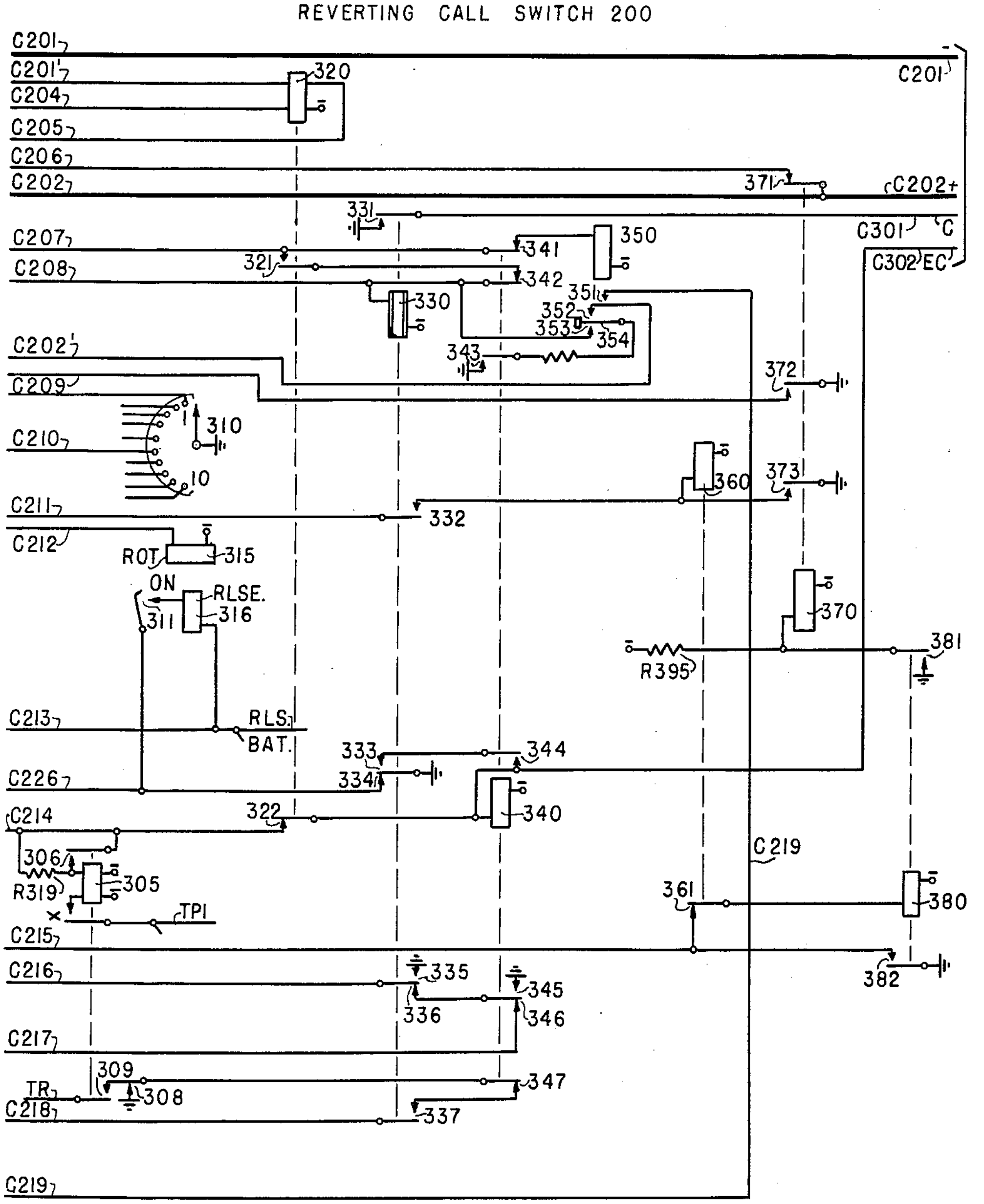

FIGS. 2 and 3, with FIG. 3 placed to the right of FIG. 2, discloses a directory number reverting call switch.

Referring briefly to FIGS. 2 and 3, the reverting call switch 200 was designed to provide reverting call service with standard well-known Strowger connectors of the terminal-per-station type without providing special apparatus in such connectors in order to complete reverting calls. To accomplish this the calling party must dial a special one-two or three-digit code which extends the call to this reverting call switch. A regular first-selector of the Strowger vertical and rotary type is associated with each reverting call switch.

When the calling party dials the called directory number following the speciail reverting call code the reverting call switch simply acts as an impulse repeater, and the the digits dialled by the calling party extend the call over selector and connector switches of the well-known Strowger type selector towards the called line. However, the last digit is stored in the reverting call switch, and sent forward only after the calling party has hung up. After the calling party hangs up, the reverting call switch causes the release of the preceeding switches to thereby remove the busy condition so that the connector may seize the called line.

After the calling party hangs up, the reverting call switch is locked up and sends the last digit. The connector, in response to the last digit selectively rings the called party only, since it cannot ring both parties. When the called party answers, the reverting call switch gives him a splash of reverting call tone to keep him on the line, and notify him that the call is of the revertive type. Then the reverting call switch releases; the connector which is arranged for last party release (standard practice) provides talking battery. The calling party thereafter should get back on the line after a reasonable wait. It will hereafter be understood that the equipment may be used with several different types of existing connector switches of the terminal per station type which transmits different types of busy supervisory signals when such connector encounters a busy line. A detailed explanation will now follow:

*Call Between Subscribers on Different Lines*

Before describing the detailed operation of the circuits involved in reverting calls, it is believed desirable to describe a non-reverting call, i.e., a call between subscribers on different lines, in order to make clear the normal operation of the system. Let it be assumed that a finder selector link of the well-known Strowger vertical and rotary type, including finder 14 and selector 15, has responded to a calling condition on line 10, for instance from substation A of party line 10 containing substations A, B and C. The distributor 13 will respond to the operation of the line relay in line circuit 12 and seize an idle finder-selector link in a conventional manner. The selector 15 will respond to the dialling of a digit and step the wipers to a desired level, for instance level 3, where the wipers will search for an idle second selector, such as 16′. Although no further selectors are shown as part of a switch train, it could be assumed that further selectors exist in the box diagram, designated SEL. SW. TRAIN 16. The second selector 16′ will respond to a second dialled digit and step accordingly. Further selectors, in larger capacity systems, would respond to further dialled digits until a connector, such as 17 is seized. The connector 17 will thereafter respond to the last two dialled digits in the well-known manner to ring the desired called party.

In regard to connector 17, this connector will be assumed to be of any well-known type of terminal per station connector that returns busy tone on a busy condition. Connector 17′ will be assumed to be of the general type disclosed in Patent No. 1,308,740 (Talbot G. Martin), which will return flash busy by intermittent reversal of battery over the line conductors in response to encountering a busy line. Connector 17″ is another type of connector which will transmit interrupted ground back over on EC lead when such connector encounters a busy-called line.

*Seizure of Reverting Call Switch*

Assuming that substation A desires to make a reverting call to substation B on his party line 10, the lifting of the receiver will close a loop circuit to a finder selector link, such as finder 14 and selector 15 in a manner previously mentioned. In this instance, the prefixed digit 9 must be dialled first before dialling the directory number designating substations B, to seize a reverting call switch such as 200, accessible on level 9 of selector 15.

Reverting call switch 200 is seized when battery is found on C conductor C203 designating that this switch is idle. The battery extending from the lower non-inductive winding of relay 270, conductor C217, contacts 346, 336, conductor C216, contacts 254, 236, C conductor C203, and to the preceding equipment in a well-known manner. Over a loop circuit including conductors C201 and C202 extending hereto, line relay 220 operates. At its contacts 221, relay 220 prepares a circuit to relay 320; at contacts 222 closes a circuit to operate slow-to-release relay 230. At its contacts 231, relay 230 places resistor R239 across the negative and positive lines C201 and C202 to seize the succeeding selector 18; the circuit extending from negative conductor C201 (terminating in selector 18) resistor R239, contacts 231 and 221, positive conductor C202 and to the succeeding switch 18. At contacts 232, a circuit is closed to operate relay 250. At contacts 233, a circuit is prepared to relay 240. At contacts 235, C conductor C203 is grounded to busy this switch to other incoming selectors. The operation of relay 250, at contacts 251 prepares a circuit to transmit busy tone to the calling subscriber. At contacts 252, a circuit is closed via conductor C208 to operate relay 330. At contacts 253, closes ground to the bottom wiper of minor switch 290. At contacts 254, opens the seizure circuit of this switch. At contacts 255, prepares a circuit to relay 270. The operation of relay 330, at contacts 331 grounds the C conductor C301 extending to the reverting selector 18. At contacts 332, prepares a circuit to relay 360. At contacts 334, removes ground from release circuits of the release magnets 296 and 316. At contacts 335, places ground on conductor C216. At contacts 337, prepares a circuit to a timer circuit. The calling subscriber will now dial the directory number of substation B.

*Dialling a Local Connector*

Assuming that the first digit of the directory number of substation B is "3," the dialling of the first digit 3 will cause line relay 220 to respond accordingly. Responsive to the first impulse of a series of three, relay 220 restores, opens contacts 221 to open the loop circuit to the reverting first selector 18. At contacts 222, the circuit to relay 230 is opened, however relay 230 is of the slow-to-release type and remains operated throughout the series of impulses. At contacts 223, a circuit is closed to operate relay 240, in which relay 240 is also of slow-to-release character and will remain operated throughout the impulse series. The operation of relay 240, at contacts 241 closes the upper winding of relay 320 in multiple with resistor 239 across the loop circuit to the succeeding selector 18 to improve pulsing thereto. At contacts 242 a circuit is closed via contacts 274 to energize rotary magnet 295 of minor switch 290 which will step the wipers onto their respective first contacts. At contacts 244, opens a prepared circuit to release magnet 296. The opening and closing of contacts 221 of relay 220 will repeat the impulses over the mentioned loop circuit to step the wipers of selector 18 to the third level thereof and search for an idle second selector, such as second selector 16'. At the end of the first series of impulses relay 220 will remain operated, and at its contacts 223 will open the circuit to relay 240 which will restore after a short interval. The stepping of the wipers of minor switch 290 to the first contact, will close the off-normal contacts 291 which prepares a circuit to the release magnet 296.

The next digits dialled will cause the reverting call switch 200 to respond in the same manner as described above with the exception that the selectors in the switch train 16 will respond to the repeated impulses for stepping purposes. Also, the wipers of rotary switch 290 will take one step to their respective second, third, fourth, etc. contacts, for each digit dialled.

After the sixth digit has been dialled the wipers of minor switch 290 would be engaging their respective sixth contacts and relay 240 will restore after a short duration. The restoration of relay 240, at contacts 243 will now complete a circuit to operate relay 270; the circuit extending from battery, upper winding of relay 270, conductor C229, the sixth contact and wiper of the bottom bank of minor switch 290, contacts 253, 243, to ground. The operation of relay 270, at contacts 271 closes a circuit via conductor C204 to operate relay 320; at contacts 272 relay 320 is placed across the loop circuit so that on the next digit dialled the succeeding equipment will not follow the dial pulses repeated at contacts 221; at contacts 273 a circuit is prepared to rotary magnet 315 of minor switch 310; at contacts 274 the circuit to rotary magnet 295 is opened; at contacts 275 a second circuit is prepared to rotary magnet 295; at contacts 277 a circuit is closed via ground, contacts 244, 264, ON contacts 291, winding of release magnet 296, conductor C213 to battery, to energize the release magnet 296 of minor switch 290; at contacts 278 relay 270 locks operated via contacts 255 and ground. The operation of release magnet 296 will thus restore the wipers of minor switch 290 to their normal position. The ON contacts 291 open to deenergize the release magnet 296. The operation of relay 320 at contacts 321 prepares a locking circuit to relay 330, and at contacts 322 opens a prepared circuit to relay 340.

Responsive to the seventh digit dialled, relays 220, 230 and 240 will operate as previously explained. The dialled pulses will not operate the succeeding equipment due to the short circuit placed across the outgoing loop. Instead, rotary magnet 315 of minor switch 310 will respond to the intermittent impulses over a circuit extending from battery, winding of rotary magnet 315, conductor C212, contacts 273, 262, 233, 223, to ground. Each time relay 220 restores responsive to digital impulses, contacts 223 will close to intermittently energize rotary magnet 315 and step the wiper of minor switch 310 one step for each impulse of the series. Upon the wiper taking the first step, the off-normal contacts 311 and 312 close which prepare respective circuits to release magnet 316 and relay 260.

At the end of pulsing, relay 220 remains operated, closes relay 230, and opens relay 240 which releases after a short duration. The restoration of relay 240, at contacts 245, closes a multiple circuit to operate relay 260; the circuit extending from battery, winding of relay 260, ON contacts 312, contacts 245, 237, conductor C218, contacts 337, 347, 308 to ground and via contacts 255 to ground. The operation of relay 260, at contacts 261 connects busy tone to the positive line C202 to return busy tone to the calling subscriber at substation A. At contacts 263, a circuit is prepared to the rotary magnet 295 of minor switch 290. At contacts 265, relay 260 locks operated to the multiple ground on conductor C218. At contacts 266, a circuit is prepared to relay 280.

*Calling Party Disconnects*

When the calling party receives the busy tone, the receiver is replaced on the cradle by the calling party to disconnect the loop circuit and await the answering of the called party. Relay 220 will restore, and at contacts 222 will open the circuit to restore relay 230 after a short duration. At contacts 223, a circuit is closed to operate relay 240 however, relay 240 has no significant value at this time and will also restore when the slow-to-release relay 230 restores and opens contacts 233. At contacts 232, relay 230 opens the circuit to relay 250. At contacts 235, ground is removed from C conductor C203 to release the preceding equipment, namely line circuit 12, distributor 13, finder 14, and selector 15 in the well known manner. After its slow-to-release interval, relay 250 restores. At contacts 251, relay 250 removes busy tone from the positive line. At contacts 252, the circuit to relay 330 is opened however, relay 330 is of slow-to-release type and remains operated. At contacts 254, ground is closed to C conductor C203 after the release of the preceding switches to mark reverting call switch 200 busy to any selectors; the ground extending from contacts 335, conductor C216, contacts 254, 236, to C conductor C203. At contacts 256, a circuit is closed to operate relay 280 via contacts 266.

The operation of relay 280, at contacts 281 and via contacts 321 and 342, completes a circuit to relay 330 to maintain relay 330 operated before it has time to release since the relay is slow-to-release. Also, at contacts 281 and via conductor C207 and contacts 341, a circuit is closed to operate relay 350. At contacts 282, a circuit is closed to start the timer. At contacts 283, a circuit is prepared to the rotary magnet 295. At contacts 284, a circuit is closed in series with resistor R319 and via conductor C214 to partially energize relay 305, which will not completely operate due to the resistance of resistor R319. At contacts 285, a circuit is closed via conductor C215 and contacts 361 to operate relay 380. The partial energization of relay 305 permits only the operation of its "X" contacts which connects conductor TPI (the timing circuit) to the lower winding of relay 305. The operation of the timer will be explained in the ensuing description.

The operation of relay 350 operates its weighted spring 354, closing contacts 351 and 352 to prepare a tick tone to the called party. The operation of relay 380, at contacts 381 closes a circuit in multiple with resistor R395 to operate relay 370. At contacts 382, and via contacts 361 relay 380 locks operated. The operation of relay 370, at contacts 371 opens the shorted outgoing loop circuit for now permitting stepping of the succeeding equipment by the transmission of the stored digit. At contacts 372, closes a circuit to operate relay 240 in multiple with rotary magnet 395, the first circuit extending from battery, winding of relay 240, contacts 234, conductor C209, contacts 372 to ground, and the second circuit including contacts 263, 283, 275, winding of rotary magnet to battery. At contacts 373, closes a circuit to operate relay 360. The operation of relay 360, opens contacts 361 and the circuit to relay 380, which restores. The restoration of relay 380 opens contacts 381, to restore relay 370. The restoration of relay 370 opens contacts 373, to restore relay 360, and at contacts 371 closes the outgoing loop to the succeeding equipment. This sequence of operations continues between relay 360, 370 and 380. On the first ground pulse from contacts 372, relay 240 operates in multiple with rotary magnet 295. Relay 240 in operating, opens contacts 244 to open another point in the circuit to release magnet 296, and at contacts 241 places resistor R239 in multiple with the upper winding of relay 320 to improve pulsing conditions. The rotary magnet 295 will thus step the wipers of minor switch 290 one step for each ground pulse received from contacts 372 by the sequential operation of relay 370. Upon the first step taken by the wipers, the ON contacts 291 close to prepare a circuit to the release magnet 296. Every time relay 370 operates its contacts 371, the succeeding equipment takes one step. Also, although relay 370 intermittently restores, and opens contacts 372, relay 240 remains operated due to its slow-to-release characteristics.

The same sequence of operations continues until the top wiper of minor switch 290 is stepped to the contact which corresponds to the seventh digit dialed on minor switch 310. As shown, each contact on the top bank of minor switch 290 is strapped to a corresponding contact on minor switch 310. Thus, when the top wiper of minor switch 290 engages a contact corresponding to the contact engaged by the wiper of minor switch 310, such as contact 6, ground will extend from the wiper of minor switch 310, the contacts 6 of each minor switch including the strap C210, top wiper of minor switch 290, conductor C211, contacts 332, winding of relay 360, to battery. Relay 360 is maintained operated, to stop the pulsing cycle between relays 370 and 380. Thus, only the amount of pulses corresponding to the seventh digit dialled will be pulsed to the connector 17. Ringing of the called party by the connector now takes place in a conventional manner.

*Called Party Answers*

When the called party answers, battery polarity is reversed from the succeeding equipment over the negative and positive conductors to relay 320 in the well-known manner. The windings of relay 320 are now energized in opposition causing this relay to restore whereby contacts 321 open the circuit to relay 330. At contacts 322, a circuit including contacts 284 and conductor C214 is closed to operate relay 340. The operation of relay 340 at contacts 341 opens the circuit to restore relay 350. At contacts 342, the circuit to relay 330 is further opened, however, relay 330 is of the slow-to-release type and remains operated a short duration. At contacts 343, a circuit is prepared to maintain relay 330 operated. At contacts 344, an obvious locking circuit is closed to relay 340. At contacts 347, the circuit to relays 260 and 270 are opened, causing restoration of these relays. The restoration of relay 350 sets the weighted spring 354 oscillating, which will at contacts 353 maintain relay 330 operated as long as the oscillation continues. The opening and closing of contacts 351, 352 and 353 will send a tick tone over the positive side of the line to the called party; when contacts 351 and 352 are closed battery through the non-inductive winding of relay 280 is sent via conductor C219, contacts 351, conductors C202', through condensers TC and LC to conductor C202, and over the positive side of the line to the succeeding equipment. This tick tone gives an indication to the called party, that this call is of the revertive type. The called party will thus wait until the calling party answers.

The restoration of relay 260 at contacts 266 opens the circuit to restore relay 280. At contacts 264, prepares a circuit to the release magnet 296. The restoration of relay 270 at contacts 271 opens the circuit to relay 320. At contacts 272, the loop circuit to the succeeding switch train is opened to release the succeeding equipment except the connector which is of the release-by-last party type of connector and is maintained operated by the answering subscriber in the well-known manner. The restoration of relay 280 at contacts 282 opens the circuit to lead TS and the timer to stop the timer. At contacts 284, the circuit to relay 305 is opened, and after a short interval due to its slow-to-release characteristics, the partially operated relay 305 will restore. The restoration of relay 305, will open its "X" contacts and remove the timer over lead TPI from its lower winding.

When the weighted spring 354 of relay 350 stops oscillating and returns to normal, the holding circuit to relay 330 will be opened at contact 353 causing relay 330 to restore after a short interval. The eventual restoration of relay 330 opens the circuit to the C conductor C301 at contacts 331. At contacts 332, the circuit is opened to restore relay 360. At contacts 333, the locking circuit to relay 340 is opened to cause restoration thereof. At contacts 334, circuits to release magnets 296 and 316 are closed respectively; the first circuit extending from ground, contacts 334, conductor C226 ON contacts 311, winding of release magnet 316, to release battery; and the second circuit extending via contacts 276, 244, 264, ON contacts 291, winding of release magnet 296, conductor C213, to release battery. The release magnets 296 and 316 will thus restore their respective wipers to normal, which will in turn open their respective ON contacts 291 and 311 and restore the release magnets. The circuit is now at normal and may be used on subsequent reverting calls. When the calling party comes back on the line by removing his handset, conversation between the calling and called parties may proceed with transmission battery being supplied by connector 17 which is maintained operated over the called loop until both subscribers replace their handsets. It is to be understood that reverting calls could be made by substation B or C in the manner explained. In considering the reason for transmitting the special tick tone signal over the multiparty line in response to the answering of the call, it will be understood that the ringers respectively provided at the calling and called substations associated with this line may possibly be arranged for energization over different sides of the line. Accordingly, the ringer provided at the calling substation is not energized during the ringing operation and the calling subscriber is not signalled as to when the call is answered. In such case the calling subscriber, after hanging up to initiate the ringing operation in the manner just explained, waits a reasonable time interval and then picks up his receiver to again establish a connection with the line. If during this interval the call is answered at the called substation, the special signal transmitted to this substation serves to inform the answering party that the call is of the reverting type. On the other hand, if the subscriber at the calling substation removes the receiver provided at this substation from its supporting hook or cradle before the call is answered, the current transmitted through the receiver provided at this substation from the special tick tone serves to signal the calling subscriber that the call has not been answered. In such case the calling subscriber may either abandon the call or may hold the connection until the call is answered.

*Timing Out*

After the last digit has been pulsed into the suceeding equipment, there is a preset time in the timer which will restore this circuit and the associated switch train, if the called line is busy, or if both the called and calling parties fail to answer.

In the event that the called party or the calling party does not answer after a predetermined time interval, the type of connectors used such as 17, 17′ or 17″ would make no difference in releasing the entire switch train. In other words, the releasing under a no answer condition would be initiated at the reverting call switch 200. It will be recalled that when relay 305 operated, it closed its "X" contacts and closed a timer to its lower winding. After a preset time, ground is closed to the lower winding of relay 305 via lead TPI which will operate relay 305 completely. The operation of relay 305 at contacts 308 removes ground from relays 260 and 270, however, at contacts 309 the timer ground is transferred from lead TR to hold these relays operated. After a short interval, the ground from the timer over lead TR is removed to restore relays 260 and 270. The restoration of relay 260 at contacts 265 opens its holding circuit, and at contacts 266 opens the circuit to restore relay 280. The restoration of relay 270 at contacts 271 and 272 opens the circuit to restore relay 320. At contacts 272 the loop circuit is opened to restore the succeeding equipment, including connector 17 if used in this case.

The restoration of relay 280 at contacts 281 opens the circuit to relays 330 and 350. At contacts 282, the timer is stopped. At contacts 284, the circuit to relay 305 is opened causing restoration thereof a short interval due to its slow-to-release characteristics. Relay 330 in restoring after a short interval removes ground from C conductor C301 to further aid in restoring the succeeding equipment including the connector (either 17, 17′ or 17″). Contacts 332 open to restore relay 360. Contacts 334 close to complete circuits to operate the release magnets 296 and 316; the first circuit extending from ground contacts 334, conductor C226, contacts 276, 244, 264, ON contacts 291, winding of release magnet 296, conductor C213 to release battery; the second circuit including conductor C226, ON contacts 311, winding of release magnet 316, to release battery. The release magnets 296 and 316 will restore their respective wipers to normal as previously explained.

*Busy Conditions*

In the event that a busy condition exists upon attempting access to a standard type connector, such as 17, busy tone will be returned over the loop circuit in a well-known manner to the reverting call switch 200. However, since the calling party has hung up on this type of call and the equipment preceding the reverting call switch 200 is already released, the busy tone has no significance. Under this condition, the call will be timed out and the equipment released in a manner described in "Timing Out".

In the event that a busy condition exists on a connector such as 17′, which as mentioned, is of the general type described in the Martin Patent No. 1,308,740, the operation of busy relay 156 (FIG. 1) would close its contacts and send intermittent battery to relay 44. The intermittent operation of relay 44 intermittently reverses battery back over line conductors C201 and C202. This reversal of battery causes the upper winding of relay 320 to be polarized in opposition to its lower winding, causing polar relay 320 to restore. The restoration of relay 320 at contacts 321 opens the circuit to relay 330, however relay 330 will remain operated for a short duration due to its slow-to-release characteristics. At contacts 322, a circuit is closed to operate relay 340 via ground, contacts 284 and conductor C214. The operation of relay 340 opens contacts 341 to restore relay 350. At contacts 344, a locking circuit to relay 340 is closed. Contacts 347 open to restore relays 260 and 270. The restoration of relay 350 will oscillate the weighted armature 354 to maintain relay 330 operated as previously described. The tick tone will have no significance at this time. When armature 354 stops oscillating, relay 330 will restore and complete a circuit to the release magnets, and the reverting call switch 200 and the succeeding switch train will return to normal in a manner previously described.

In the event that a busy condition arises using a connector such as 17″ (FIG. 1), which is as mentioned a modification of connector 17′, the operation of busy relay 156′ would close its contacts to return a flash ground over the EC lead. This ground would come in over EC conductor C302 and operate relay 340 which would immediately lock operated via contacts 344. Contacts 341 open whereby relay 350 would restore to oscillate its weighted armature 354 to maintain relay 330 operated when contacts 342 open. The operation of relay 340 will restore relays 260 and 270 as previously mentioned. The restoration of relay 270 will restore relay 320 and open the loop circuit to release the succeeding equipment. At the end of the oscillation of armature 354, relay 330 will restore, all as previously described and complete a circuit to release the minor switch wipers. Reverting call switch 200 is now at normal.

From the foregoing it will be seen that when a busy line is encountered the release of the reverting call switch is determined by the type of connector used in the connection extended to the busy called line. If connector 17, which only transmits busy tone back over the line conductors when a busy line is encountered, is used in a reverting call, then the reverting call switch is automatically released by the time switch after a predetermined time. If connector 17′, which intermittently reverses battery back over the line conductors when a busy line is encountered, is used in a reverting call, then the reverting call switch is released in the same manner as is done when the reverting call is answered. If the connector 17", which sends interrupted ground back over the EC conductor when a busy line is encountered, is used in the reverting call, then the reverting call switch is released in a manner somewhat similar to the release on answering a reverting call. Only connectors, such as connector 17, cause a predetermined delay, under control of the time switch, in the releasing of the reverting call switch.

*Calling Party Disconnects Before Busy Tone Is Heard*

If the calling party disconnects immediately after dialling the seventh digit, and not waiting for busy tone, the following relay seqeunce occurs:

The loop is opened to restore relay 220, opening contacts 222 to restore relay 230 after a short interval, but not before closing a circuit to maintain relay 240 operated via contacts 223 and 233. The operation of relay 240 maintains contacts 245 open to maintain the circuit to relay 260 open. After its slow-to-release interval relay 230 restores, opening contacts 232 and 233 to open circuits to relays 250 and 240 respectively. At contacts 237, further opening of a circuit to relay 260 is consumated. Contacts 235 open to disconnect ground from conductor C203 to release the preceding switches. After its slow-to-release interval relay 250 restores, opening a circuit to relay 330. After their slow-to-release interval relays 240 and 330 restore, whereby at contacts 334 a beforementioned circuit to release magnet 316 is closed. At contacts 331, ground is removed from C conductor C301 to release the succeeding equipment. The release magnet 316 will thus restore its wiper to a normal position.

Since relay 230 restored before relay 240, the circuit to relay 260 was never completed. Also since relay 260 never operated relay 280 could not operate to start rotating the wipers of minor switch 290 to the corresponding seventh digit dialled into minor switch 310. Thus, the seventh digit was not repeated to the succeeding switch train, but merely stored on the bank of minor switch 310.

This reverting call circuit may also be used for testing purposes by telephone installers to determine if the telephone he has installed is working correctly and if the substation line conductors are connected to the correct set of connector bank contacts. After installing a new phone at the subscriber's residence, the installer will dial the prefix reverting call digit and then dial the directory telephone number of the new substation just installed. After dialling the last digit and in response to the reverting call switch sending busy tone back to the calling installer, the installer will replace the handset on the cradle. Shortly thereafter, if all apparatus is correctly connected, the ringer at the new installed telephone should ring. The installer may answer his own call and thereby verify the correct installation.

While one embodiment of the invention has been disclosed, it will be understood that various modifications may be made therein which are within the true spirit and scope of the invention.

What is claimed is:

1. In a multiparty line telephone system, a party line having a plurality of substations thereon, each substation having an individual directory telephone number, a train of automatic switches for completing connections to a called substation on said party line from calling lines in response to the receipt of the dialled digits corresponding to the directory number of the called substation, a reverting call switch, means responsive to a calling substation on said party line dialling a prefix digit for seizing said reverting call switch, repeating means in said seized reverting call switch, operated in response to the receipt of received impulses for directly repeating all of the digits received thereby except the last digit of the directory number of a called substation on said party line, to operate said train of automatic switches to extend the connection towards the called line, a first minor switch and a second minor switch in said reverting call switch, said first minor switch responsive to each digit dialled to count each digit dialled by moving its wipers one step for each dialled digit, means responsive to the dialling of the next to last digit of the called substation's directory number to transfer the last dialled digit for direct respondance by said second minor switch, said second minor switch taking steps corresponding to and commensurate with the number of impulses in the last digit dialled of the directory number of the called substation for storage responsive to the dialling thereof, means responsive only to the calling party disconnecting for repeating the stored digit on said second minor switch to said switch train, means in said switch train responsive to said repeated stored digit for signalling the called substation on said party line, and means in said reverting call switch operated responsive to the answering of said call on said party line for generating and transmitting a special tone over the called line to inform the answering party that this call is of the revertive type.

2. In a multiparty telephone system, a party line having a plurality of substations thereon, each substation having an individual directory telephone number, a train of automatic switches including a connector as the last switch of said train for completing connections to a called substation on said party line from calling lines in response to the receipt of the dialled digits corresponding to the directory number of the called substation, a reverting call switch, means responsive to a calling substation on said party line dialling a prefix digit for seizing said reverting call switch, counting and repeating means in said seized reverting call switch for directly repeating all but the last digit of the directory number of a called substation on said party line to operate said train of automatic switches to extend the connection towards the called line, means in said reverting call switch for storing the last digit of said dialled directory number, means for transmitting said stored digit to the connector in said switch train in response to the calling substation replacing his receiver, releasing means in said reverting call switch, means in said connector for returning a flash busy signal to said reverting call switch responsive to a busy condition on said called line encountered by said connector after the calling substation has replaced his receiver, means in said reverting call switch operated responsive to the receipt of said busy flash signal to operate sai dreleasing means to thereby release the reverting call switch and the automatic switch train.

3. In a multiparty line telephone system, a party line having a plurality of substations thereon, each substation having an individual directory telephone number, a train of automatic switches for completing connections to a called substation on said party line from calling lines in response to the receipt of the dialled digits corresponding to the directory number of the called substation, a reverting call switch, means responsive to a calling substation on said party line dialling a prefix digit for seizing said reverting call switch, counting and repeating means in said seized reverting call switch for directly repeating all but the last digit of the directory number of a called substation on said party line to operate said train of automatic switches to extend the connection towards the called line, means in said reverting call switch for storing the last digit of said dialled directory number, a special tone controlling relay in said reverting call switch having a weighted armature, means for transmitting said stored digit to the last switch in said train and operating said relay in response to the calling substation replacing his receiver, means for operating sai dlast switch in response to the receipt of said stored digit to connect with said party line and ring the called substation, means responsive to the answering of said call for restoring said relay to cause said armature to oscillate, and circuit means controlled by said oscillating armature to transmit a special tone over said party line to designate to the answering party on said party line that the call is of the revertive type.

References Cited in the file of this patent

UNITED STATES PATENTS

| | | |
|---|---|---|
| 2,335,473 | Bakker | Nov. 30, 1943 |
| 2,541,362 | Jones | Feb. 13, 1951 |
| 2,659,769 | Elliott | Nov. 17, 1953 |
| 2,826,639 | Pharis | Mar. 11, 1958 |
| 2,871,296 | Pharis | Jan. 27, 1959 |
| 2,917,585 | Cox | Dec. 15, 1959 |